United States Patent
Ioannone et al.

(10) Patent No.: US 8,412,724 B2
(45) Date of Patent: Apr. 2, 2013

(54) OPTIMIZED SATELLITE IMAGE RETRIEVAL

(75) Inventors: Alissa Ioannone, Chieti (IT); Gian Luca Eusebi Borzelli, Rome (IT)

(73) Assignee: Telespazio S.p.A., Rome (IT)

( * ) Notice: Subject to any disclaimer, the term of this patent is extended or adjusted under 35 U.S.C. 154(b) by 0 days.

(21) Appl. No.: 13/139,023

(22) PCT Filed: Dec. 10, 2008

(86) PCT No.: PCT/IT2008/000756
§ 371 (c)(1),
(2), (4) Date: Oct. 28, 2011

(87) PCT Pub. No.: WO2010/067388
PCT Pub. Date: Jun. 17, 2010

(65) Prior Publication Data
US 2012/0036142 A1  Feb. 9, 2012

(51) Int. Cl.
*G06F 17/30* (2006.01)
(52) U.S. Cl. .................................................. 707/758
(58) Field of Classification Search .............. 707/758
See application file for complete search history.

(56) References Cited

U.S. PATENT DOCUMENTS

| | | |
|---|---|---|
| 2006/0122776 A1 | 6/2006 | Knowles |
| 2007/0168370 A1 | 7/2007 | Hardy |
| 2008/0025561 A1* | 1/2008 | Rhoads et al. ............. 382/100 |
| 2008/0102809 A1 | 5/2008 | Beyer |

OTHER PUBLICATIONS

Anderson, et al., Sequoia 2000 Metadata Schema for Satellite Images, Sigmod Record, vol. 23, No. 4, Dec. 1994, pp. 42-48.
Holowczak et al., An Experimental Study on Content-Based Image Classification for Satellite Image Databases, IEEE Transactions on Geoscience and Remote Sensing, vol. 40, No. 6, Jun. 2002, pp. 1338-1347.
PCT International Search Report and Written Opinion dated Jun. 29, 2009.

* cited by examiner

*Primary Examiner* — Belix M Ortiz Ditren
(74) *Attorney, Agent, or Firm* — McCarter & English, LLP

(57) ABSTRACT

The present invention concerns a satellite image retrieving system that comprises electronic input means, electronic retrieving means, and electronic storing means. The electronic input means are coupled with the electronic retrieving means and are configured to generate input data and to provide the electronic retrieving means with said input data. The input data is indicative of a given geographic area. The electronic retrieving means are coupled with the electronic storing means that are configured to store satellite images, each satellite image stored on the electronic storing means representing a corresponding area of the earth's surface and being associated with corresponding telemetry data generated and associated with the satellite image by a satellite that has remotely sensed the satellite image. The satellite image retrieving system is characterized in that the electronic retrieving means are configured to retrieve a satellite image stored on the storing means from the electronic storing means on the basis of the input data and of the telemetry data associated with the satellite images stored on the electronic storing means.

15 Claims, 1 Drawing Sheet

OPTIMIZED SATELLITE IMAGE RETRIEVAL

TECHNICAL FIELD OF THE INVENTION

The present invention concerns retrieving satellite images from an electronic archive.

In particular, the present invention finds advantageous, but not exclusive, application in the management of electronic archives of satellite-remotely-sensed images to which the following description makes explicit reference, but without any resultant loss of generality.

STATE OF THE ART

As is known, satellite observation systems, such as COSMO-SkyMed (Constellation of Small Satellites for Mediterranean basin Observation) system, provide high-resolution space images of the Earth that can be used both for institutional/commercial civil purposes and for military purposes.

In particular, the following are few examples of institutional/commercial civil applications that make use of satellite-remotely-sensed images, or simply satellite images:
  environmental disaster prevention and management,
  ocean and coast control,
  agricultural and forest resource control,
  building control, and
  high-resolution technical and thematic map-making.

In general, satellite observation systems comprise a Space Segment and a Ground Segment.

In detail, the Space Segment normally consists of a plurality of satellites equipped with Synthetic Aperture Radars (SARs) that remotely sense high-resolution images of areas of the earth's surface.

For example, when completed, the COSMO-SkyMed system will comprise a constellation of four satellites equipped with high-resolution SARs operating in the X band and will be able to take up to 450 shots a day of the earth's surface, the equivalent of 1,800 SAR images every 24 hours.

The Ground Segment, instead, consists of the infrastructures for the control and management of the satellites and for the reception, filing, management, processing and distribution of the data and satellite images received from the Space Segment.

Today, a variety of satellite observation systems are available, each of which supplies a very large number of satellite images every day. Therefore, it is easily surmised how the management of these images must be increasingly complex.

If this is combined with the fact that the satellite images provided by the satellite observation systems are not immediately associable with a geographic context, that is the satellite images in themselves do not provide any indication regarding the corresponding area of the earth's surface that is shown in them, it is easily understood how the management of these images is anything but simple.

In particular, it is very complicated to retrieve a satellite image of a geographic area of interest from an electronic archive of satellite images.

In fact, satellite images are normally organized and stored on electronic archives according to standard formats that have appropriate structures to manage the mass of information that they contain, but which do not allow immediate association with geographic context.

For example, in the case of the COSMO-SkyMed system, satellite images are organized and stored in a format known as hdf5 (hierarchical data format version 5) and identified by a series of numbers that indicate the date and time of acquisition by the satellite that has remotely sensed them. For example, a COSMO-SkyMed image held in an hdf5 file identified by the string 20070720103223_20070720103220.h5 corresponds to an acquisition made on 20 Jul. 2007 between 10:23:23 and 10:23:20.

Therefore, the retrieval of a satellite image of a geographic area of interest from an electronic archive of satellite images composed of files named as just described is only possible after having associated the corresponding geographic context with the satellite images, or rather the corresponding geographic areas shown in them.

To that end, various techniques have been developed over the years for providing indications regarding the geographic area corresponding to a satellite image, i.e. for carrying out satellite image georeferencing.

In particular, of the various techniques for satellite image georeferencing, there are some extremely accurate ones based on the acquisition of geographic coordinates of certain recognizable points in the satellite image, generally known as "ground control points", and the subsequent extrapolation, based on these ground control points, of the geographic coordinates of all the pixels in the satellite image via interpolation operations.

These techniques, although very accurate, are not useful for retrieving a satellite image from an electronic archive of satellite images, as they require intensive effort and long, in-situ sampling times.

Therefore, until now, less accurate but more rapid techniques, based on so-called orbit propagators, have been used for retrieving a satellite image from an electronic archive of satellite images.

In detail, given a geographic area of interest for which it is wished to retrieve the corresponding satellite image from an electronic archive of satellite-remotely-sensed images, the techniques based on orbit propagators involve simulations in a virtual environment of the orbits of the satellites in order to identify the particular position of the particular satellite that originated the remote sensing of a satellite image of an area of the earth's surface including the area of interest, a satellite image that is then retrieved from the electronic archive because it corresponds to the geographic area of interest.

As can be easily surmised, these simulations in a virtual environment and, in consequence, the techniques based on orbit propagators, have very heavy computational needs and therefore require the use of very powerful processors, generally known as super-computers.

FIG. 1 schematically shows an example of a reference system used by the techniques based on orbit propagators for giving the position of a satellite 10.

In detail, as shown in FIG. 1, the satellite position 10 is given by six orbital parameters that include:
  three centre of mass coordinates, respectively named $x_M$, $y_M$ and $z_M$, each of which expresses the position of the centre of mass of the satellite 10 with respect to a respective reference axis, respectively indicated in FIG. 1 as X, Y and Z, and
  three rotational coordinates, respectively indicated in FIG. 1 as ROLL, PITCH and YAW, each of which expresses a possible rotation of the satellite 10 around the respective X, Y or Z-axis.

SUBJECT AND SUMMARY OF THE INVENTION

The Applicant has noted that the problem related to retrieving satellite images from an electronic archive of satellite images can be summarized in the difficulty of georeferencing satellite images in a short time and in a sufficiently accurate manner, i.e. of associating the corresponding geographic contexts with the satellite images, or rather the corresponding geographic areas shown in them.

At present, techniques based on orbit propagators are usually employed for retrieving satellite images, although, as previously mentioned, such techniques require very complex processing and therefore the use of a super-computer.

In fact, in practice, calculation of the ROLL, PITCH and YAW rotational coordinates and the $x_M$, $y_M$ and $z_M$ centre of mass coordinates of a satellite through simulation operations in a virtual environment is very complex.

As an example, in the case of a satellite that orbits at a height of 800 Km and has a spatial resolution of 10 m, such as the SPOT4 satellite in panchromatic acquisition mode, it is easy to verify how an error of a hundredth of a degree in calculating the rotational coordinate of the centre of mass around the ROLL line of motion induces a positioning error in the pixels ΔR equal to:

$$\Delta R \approx 800 * 10^3 * tg\left(\frac{10^{-2}\pi}{180}\right) \approx 140 \text{ m}$$

Thus, it is easy to surmise how problematic the determination of a satellite's $x_M$, $y_M$, $z_M$, ROLL PITCH and YAW orbital parameters is, especially when dealing with a satellite with a spatial resolution of less than one meter and for which the size of an entire scene does not exceed 5 km².

In these cases, even a small error in determining the $x_M$, $y_M$, $z_M$, ROLL, PITCH and YAW orbital parameters can result in the retrieval of a satellite image that does not actually show the geographic area of interest.

Therefore, to ensure correct determination of the $x_M$, $y_M$, $z_M$, ROLL, PITCH and YAW orbital parameters, techniques based on orbit propagators require super-computing techniques based on the use of super-computers, which are extremely expensive and for this reason often not available even for large companies such as the Applicant.

Therefore, to retrieve satellite images it is necessary to own at least one super-computer with very high costs, or rely on companies that have a super-computer and provide this type of service, with a consequent delay in the supply of satellite images to the end users, a delay that cannot be tolerated in certain cases.

For example, the case in which an environmental disaster occurs could be considered, such as an earthquake or flood in a given geographic area, such as Sardinia. In such a case, a plurality of institutional/government bodies would immediately be set in motion, such as the Italian Civil Defense, to bring aid and estimate the damage. The Italian Civil Defense, although having access to an electronic archive of satellite images, would have the need to retrieve those regarding Sardinia in order to use them to identify the zones most affected by the cataclysm, to then coordinate rescue operations and, lastly, to estimate the damages.

In order to do all of this, the Italian Civil Defense must ask a company or another body, for example, the European Space Agency (ESA), equipped with at least one super-computer configured for the orbit propagators calculation, which satellite images to retrieve and then use for the above-mentioned purposes.

Typically, ESA provides the answers within a few days, a delay that, as can be easily inferred, could render the Italian Civil Defense's use of the satellite images totally meaningless.

The objective of the present invention is therefore that of providing a satellite image retrieving system that, in general, is able to mitigate the drawbacks just mentioned and, in particular, avoids the need of having to use super-computers.

The above-indicated objective is achieved by the present invention in that it concerns a satellite image retrieving system according to that defined in the enclosed claims.

In particular, the present invention concerns a satellite image retrieving system that comprises electronic input means, electronic retrieving means and electronic storing means.

In detail, the electronic input means are coupled with the electronic retrieving means and are configured to generate input data, and to provide the electronic retrieving means with said input data, the input data being indicative of a given geographic area.

In addition, the electronic retrieving means are coupled with the electronic storing means which are configured to store satellite images, each satellite image stored on the electronic storing means representing a corresponding area of the earth's surface and being associated with corresponding telemetry data generated and associated with the satellite image by a satellite that has remotely sensed the satellite image.

The satellite image retrieving system according to the present invention is characterized in that the electronic retrieving means are configured to retrieve a satellite image stored on the electronic storing means from the electronic storing means based on the input data and the telemetry data associated with the satellite images stored on the electronic storing means.

BRIEF DESCRIPTION OF DRAWINGS

For a better understanding of the present invention, some preferred embodiments, provided purely by way of non-limitative example, shall now be illustrated with reference to enclosed drawings (not in scale), where.

DETAILED DESCRIPTION OF PREFERRED EMBODIMENTS OF THE INVENTION

Figure 1:
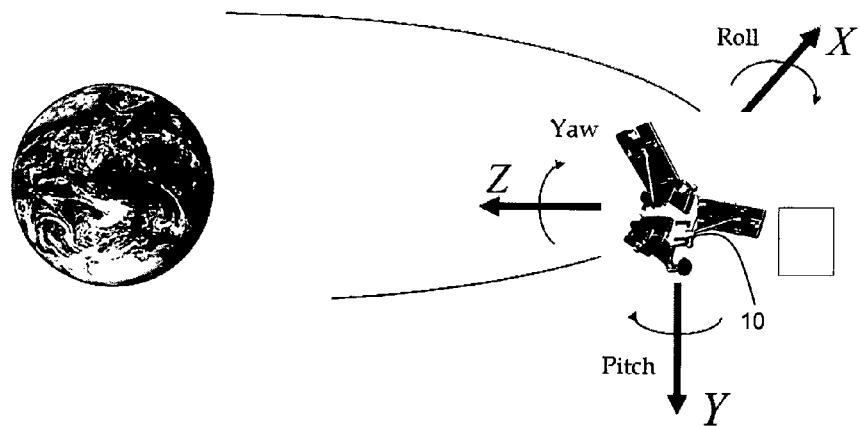
FIG. 1 schematically shows a reference system used by techniques based on orbit propagators to express the position of a satellite, and FIG. 2 schematically shows a satellite image retrieving system according to the present invention.

The following description is provided to allow an expert in the field to embody and use the invention. Various modifications to the embodiments shown shall be immediately evident to experts and the generic principles disclosed herein could be applied to other embodiments and applications, without however departing from the scope of protection of the present invention.

Therefore, the present invention should not be intended as limited to just the embodiments described and shown, but granted the broadest scope of protection consistent with the principles and characteristics presented herein and defined in the enclosed claims.

Furthermore, the present invention is embodied by means of a software program comprising portions of code configured to totally or partially implement the satellite image retrieving system described in the following when the software program is loaded in the memory of a computer and executed on said computer.

The present invention derives from an insight of the Applicant to exploit telemetry data for georeferencing a satellite image.

In fact, a satellite that remotely senses a satellite image generates telemetry data that it associates with the satellite image and transmits with it to earth.

In particular, the telemetry data associated with the satellite image comprises remote sensing data, which is indicative of a field of view and a spatial resolution of a remote sensing electronic device, a SAR for example, by means of which the satellite has remotely sensed the satellite image, and positioning data, which indicates the position of the satellite at the moment in which it remotely sensed the satellite image.

In particular, the positioning data could conveniently include an earth position of the satellite, which represents the projection on the earth's surface of the position assumed in space by the satellite at the moment in which the satellite remotely sensed the satellite image, or an "exact" instant of remote sensing of the satellite image.

In both cases, a space location of the satellite is unambiguously identifiable.

In fact, in the first case, the space location of the satellite can be determined by projecting the earth position onto the satellite's space orbit, a space orbit that is always known a priori. In the second case, the space location assumed by the satellite along the corresponding space orbit at the "exact" instant of remote sensing can equally be determined unambiguously.

Preferably, the "exact" instant is expressed by a time measure that has a precision of at least one hundredth of a second.

Therefore, according to the present invention, once the space location of the satellite that has remotely sensed the satellite image is derived from the telemetry data, a geographic area represented in the satellite image is derived on the basis of this space location and the remote sensing data contained in the telemetry data.

In fact, as the remote sensing data contained in the telemetry data, as previously mentioned, is indicative of the field of view and the spatial resolution of the remote sensing electronic device, by means of which the satellite has remotely sensed the satellite image, the geographic area represented in the satellite image is derived on the basis of:
- the space location of the satellite that has remotely sensed satellite image, and
- the field of view and the spatial resolution of the remote sensing device by means of which the satellite has remotely sensed the satellite image.

In particular, by simple and rapid trigonometric calculations based on the space location of the satellite, the field of view and the spatial resolution of the remote sensing device, both the centre point, or more precisely the coordinates of the centre point, of the geographic area represented in the satellite image, and the four vertex points, or more precisely the coordinates of the four vertex points, of the geographic area represented in the satellite image can be derived.

The satellite image retrieving system forming the subject of the present invention shall now be described in detail and with reference to FIG. 2.

Figure 2:
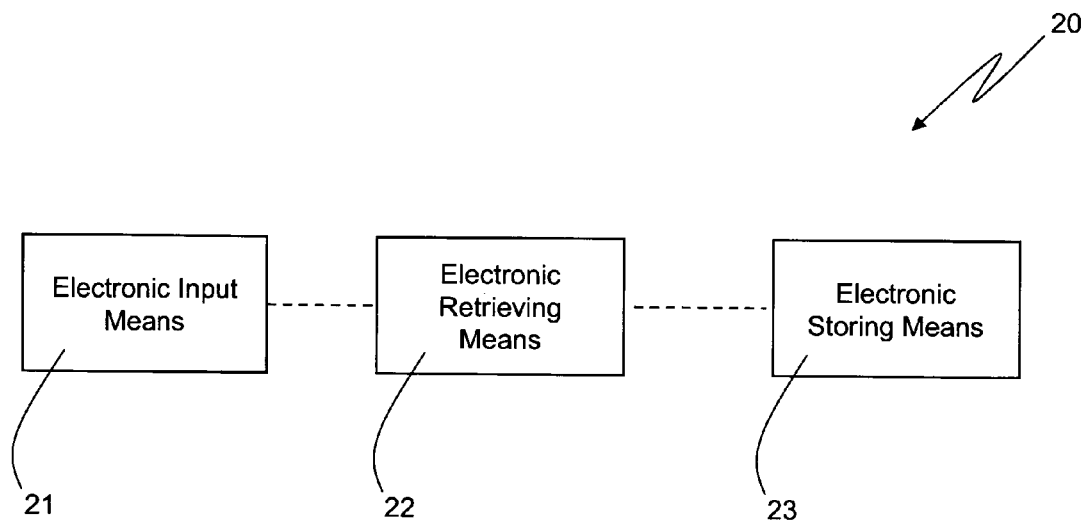

In particular, FIG. 2 shows a block diagram of a satellite image retrieving system 20 according to the present invention.

In detail, the satellite image retrieving system 20 comprises:
- electronic input means 21,
- electronic retrieving means 22, and
- electronic storing means 23.

In particular, the electronic input means 21 are coupled with the electronic retrieving means 22 and are configured to generate input data which is indicative of a given geographic area, and to provide the electronic retrieving means 22 with said input data.

For example, the electronic input means 21 may conveniently include a location satellite system receiver, for example a GPS (Global Positioning System) or Galileo receiver. In this case, the input data includes a position computed by the location satellite system receiver.

Preferably, the electronic input means 21 may also be configured to accept information entered by a user regarding a geographic area of interest to the user, and to generate the input data based on the information regarding the geographic area of interest to the user.

For example, the electronic input means 21 may also include a touch screen configured to display a geographic map and to generate the input data based on an area of the geographic map touched or brushed over by a user, the input data that in this case includes geographic coordinates of four vertices of the area of the geographic map touched or brushed over by the user, i.e. the area of interest to the user.

Moreover, the electronic input means 21 may also include a screen, a mouse and first electronic processing means which are mutually coupled, the screen being configured to display a geographic map, the mouse being configured to allow a user to select an area of the geographic map displayed on the screen and the first electronic processing means being configured to generate the input data based on the area of the geographic map selected by the user with the mouse, the input data including, in this case, geographic coordinates of four vertices of the area of the geographic map selected by the user with the mouse, i.e. the area of interest to the user.

Furthermore, the electronic input means 21 may also include a keyboard and second electronic processing means which are mutually coupled, the keyboard being configured to accept a string of letters entered by a user and to supply the string of letters to the second electronic processing means that are trained to interpret the string of letters, associating with the string of letters a corresponding geographic area of interest to the user. The second electronic processing means are configured to generate the input data based on the geographic area of interest to the user, the input data including geographic coordinates of four vertices of the area of interest to the user.

For example, if the user enters the string of letters "Italy" via the keyboard, the second electronic processing means interpret this string of letters, associating the coordinates of four geographic points defining a geographic area that includes Italy with them. In this example, the input data includes the geographic coordinates of the four geographic points defining the geographic area that includes Italy.

Mutatis mutandi with regard to the example just described, the electronic input means 21 may also include a microphone and third electronic processing means which are mutually coupled, a voice-recognition software program also being installed on the third electronic processing means.

Moreover, according to the present invention, the electronic retrieving means 22 are coupled with the electronic storing means 23, which are configured to store satellite images, each of which represents a corresponding area of the earth's surface and is associated with corresponding telemetry data generated and associated with the satellite image by a satellite that has remotely sensed the satellite image.

Furthermore, according to the present invention, the electronic retrieving means 22 are configured to retrieve a satellite image stored on the electronic storing means 23 from the electronic storing means 23 on the basis of the input data and the telemetry data associated with the satellite images stored on the electronic storing means 23.

In particular, once the input data from the electronic input means 21 is received, the electronic retrieving means 22 retrieve at least one satellite image stored on the electronic storing means 23 in which the given geographic area is represented, even if only partially.

In detail, the electronic retrieving means 22 are configured to:
- select a satellite image stored on the electronic storing means 23;
- identify an area of the earth's surface shown in the selected satellite image on the basis of the telemetry data associated with the selected satellite image;
- check, on the basis of the input data and the area of the earth's surface shown in the selected satellite image, whether the given geographic area is represented, even if only partially, in the selected satellite image; and
- retrieve the selected satellite image from the electronic storing means 23 when the given geographic area is represented, even if only partially, in the selected satellite image.

Furthermore, for each satellite image stored on the electronic storing means 23, the corresponding telemetry data includes:
- positioning data that is indicative of a satellite position, this position of the satellite corresponding to remote sensing of the satellite image by the satellite; and
- remote sensing data that is indicative of a field of view and of a spatial resolution of a remote sensing electronic device by means of which the satellite has remotely sensed the satellite image.

Preferably, the electronic retrieving means 22 are also configured to:
- store orbital data that, for each satellite that has remotely sensed at least one satellite image stored on the storing means 23, is indicative of a corresponding space orbit of the satellite;
- compute a space location of the satellite that has remotely sensed the selected satellite image on the basis of the positioning data included in the telemetry data associated with the selected satellite image and on the basis of the orbital data corresponding to the satellite that has remotely sensed the selected satellite image, and
- generate georeferencing data of the selected satellite image on the basis of the calculated space location and of the remote sensing data included in the telemetry data associated with the selected satellite image, the georeferencing data being indicative of the area of the earth's surface shown in the selected satellite image.

The georeferencing data of the selected satellite image conveniently includes geographic coordinates of four vertices of the area of the earth's surface shown in the selected satellite image.

Conveniently, the electronic retrieving means 22 check if the given geographic area is represented, even if only partially, in the selected satellite image by comparing the georeferencing data with the input data.

In particular, when the electronic input means 21 includes the location satellite system receiver and, in consequence, the input data includes the position computed by the location satellite system receiver, the electronic retrieving means 22 check that the given geographic area is represented, even if only partially, in the selected satellite image when the position computed by the location satellite system receiver is within the area of the earth's surface shown in the selected satellite image.

Instead, when the electronic input means 21 include the touch screen, and/or the screen, the mouse and the first electronic processing means, and/or the keyboard and the second electronic processing means, and/or the microphone and the third electronic processing means, and, in consequence, the input data includes the geographic coordinates of the four vertices of the geographic area of interest to the user, the electronic retrieving means 22 check that the given geographic area is represented, even if only partially, in the selected satellite image when the geographic coordinates of at least one of the four vertices of the geographic area of interest to the user are within the area of the earth's surface shown in the selected satellite image.

Conveniently, the satellite image retrieving system 20 may also include electronic display means, not shown in FIG. 2, such as a screen, coupled with the electronic retrieving means 22. In particular, in this case, the electronic retrieving means 22 are also configured to provide the satellite image retrieved from the electronic storing means 23 to the electronic display means that, in turn, are configured to display it.

From the previous description, the advantages of the satellite image retrieving system according to the present invention can be immediately appreciated.

In particular, it is wished to underline how all processing carried out by the satellite image retrieving system according to the present invention is very light computation-wise and can therefore be handled even by computers endowed with average computation power, such as a normal computer, even a laptop one, thereby avoiding the need to use super-computers and, in consequence, accelerating the process of request, retrieval and use of the satellite image by a user.

Another advantage of the present invention lies in the fact of being able to embody it indifferently by means of a concentrated or distributed architecture.

In fact, the satellite image retrieving system according to the present invention could advantageously be embodied by means of a single computer equipped with keyboard, screen, mouse and possibly a microphone and possibly coupled with a GPS receiver, on which the satellite images are stored, and comprising a software program that, when executed by the computer, implements the electronic retrieving means and, simultaneously or alternatively, the first, second and third electronic processing means.

To similar advantage, the satellite image retrieving system according to the present invention could also be embodied by means of:
- a first computer, such as a laptop, equipped with a keyboard, screen, touchpad and possibly a microphone and possibly coupled with a GPS receiver, and comprising a first software program that, when executed by the first computer, simultaneously or alternatively, implements the first, second and third electronic processing means, and
- a second computer, such as a server, remotely connected to the first computer over a telecommunications network and comprising a second software program that, when executed by the second computer, implements the electronic retrieving means.

In turn, the second computer could store the satellite images, or be connected via a telecommunications network to a database that stores the satellite images.

Finally, it is clear that various modifications can be made to the present invention, all falling within the scope of protection of the invention defined in the enclosed claims.

The invention claimed is:

1. A satellite image retrieving system (20) comprising electronic input means (21), electronic retrieving means (22), and electronic storing means (23), the electronic retrieving means (22) being coupled with the electronic input means (21) and the electronic storing means (23);

wherein the electronic input means (21) is configured to generate input data of a given geographic area and to provide the electronic retrieving means (22) with said input data;

wherein the electronic storing means (23) is configured to store:
(i) satellite images each representing a corresponding area of the earth's surface and
(ii) for each stored satellite image, corresponding telemetry data generated and associated with the stored satellite image by a satellite that has remotely sensed the stored satellite image,
said corresponding telemetry data including:
(i) positioning data indicative of a position of said satellite when it has remotely sensed the stored satellite image, and
(ii) remote sensing data indicative of a field of view and a spatial resolution of a remote sensing device by means of which said satellite has remotely sensed the stored satellite image;

wherein the electronic retrieving means (22) is configured to:
(i) store, for each satellite that has remotely sensed at least one satellite image stored on the electronic storing means (23), corresponding orbital data indicative of a corresponding space orbit of said satellite;
(ii) select a satellite image stored on the electronic storing means (23);
(iii) compute a space location of the satellite that has remotely sensed the selected satellite image on the basis of the positioning data included in the telemetry data associated with said selected satellite image and stored on the electronic storing means (23), and also on the basis of the stored orbital data corresponding to the satellite that has remotely sensed the selected satellite image;
(iv) generate georeferencing data of the selected satellite image on the basis of the computed space location of the satellite that has remotely sensed said selected satellite image and also on the basis of the remote sensing data included in the telemetry data associated with said selected satellite image and stored on the electronic storing means (23), the georeferencing data being indicative of an area of the earth's surface shown in the selected satellite image;
(v) check whether the given geographic area is represented, even if only partially, in the selected satellite image by comparing the generated georeferencing data of said selected satellite image with the input data; and
(vi) retrieve the selected satellite image from the electronic storing means (23) if the given geographic area is represented, even if only partially, in the selected satellite image.

2. The satellite image retrieving system according to claim 1, wherein the electronic retrieving means (22) is configured to compute, by trigonometric calculations based on the computed space location of the satellite that has remotely sensed said selected satellite image and also based on the remote sensing data included in the telemetry data associated with said selected satellite image and stored on the electronic storing means (23), geographic coordinates of the centre point and of four vertices of the area of the earth's surface shown in said selected satellite image; and wherein the generated georeferencing data of the selected satellite image includes said computed geographic coordinates of the centre point and of the four vertices of the area of the earth's surface shown in the selected satellite image.

3. The satellite image retrieving system according to claim 1, wherein the electronic input means (21) include a location satellite system receiver;
wherein the input data includes a position computed by the location satellite system receiver; and
wherein the electronic retrieving means (22) is configured to detect that the given geographic area is represented, even if only partially, in the selected satellite image if the position computed by the location satellite system receiver is within the area of the earth's surface shown in the selected satellite image.

4. The satellite image retrieving system according to claim 1, wherein the electronic input means (21) are further configured to:
(i) accept entry by a user of information regarding a geographic area of interest to the user; and
(ii) generate the input data based on the information regarding the geographic area of interest to the user.

5. The satellite image retrieving system according to claim 1, wherein the electronic input means (21) include a touch screen configured to display a geographic map and to generate the input data based on an area of the geographic map touched by a user, the input data including geographic coordinates of four vertices of the area of the geographic map touched by the user.

6. The satellite image retrieving system according to claim 1, wherein the electronic input means (21) include a screen, a mouse, and an electronic processing means which are mutually coupled, the screen being configured to display a geographic map, the mouse being configured to allow a user to select an area of the geographic map displayed on the screen, and the electronic processing means being configured to generate the input data based on the area of the geographic map selected by the user with the mouse, the input data including geographic coordinates of four vertices of the area of the geographic map selected by the user with the mouse.

7. The satellite image retrieving system according to claim 1, wherein the electronic input means (21) include a keyboard and an electronic processing means which are mutually coupled, the keyboard being configured to accept a string of letters entered by a user and to supply the string of letters to the electronic processing means that are trained to interpret the string of letters associating a corresponding geographic area of interest to the user with the string of letters, the electronic processing means being configured to generate the input data based on said geographic area of interest to the user, the input data including geographic coordinates of four vertices of the geographic area of interest to the user.

8. The satellite image retrieving system according to claim 5, wherein the electronic retrieving means (22) are configured to detect that the given geographic area is represented, even if only partially, in the selected satellite image when at least the geographic coordinates of one of the four vertices are within the area of the earth's surface shown in the selected satellite image.

9. The satellite image retrieving system according to claim 1, further comprising electronic display means coupled with the electronic retrieving means (22), the electronic retrieving means (22) being further configured to supply the satellite image retrieved from the electronic storing means (23) to the electronic display means that are configured to display it.

10. The satellite image retrieving system according to claim 1, wherein the electronic input means (21) are connected to the electronic retrieving means (22) by means of a telecommunication network.

11. The satellite image retrieving system according to claim 1, wherein the electronic retrieving means (22) are connected to the electronic storing means (23) by means of a telecommunication network.

12. A satellite image storage and management system comprising the satellite image retrieving system (20) according to claim 1.

13. A non-transitory processor readable medium comprising processor executable instructions for retrieving a satellite image, said medium including instructions for:
   (i) selecting a satellite image;
   (ii) computing a space location of a satellite that has remotely sensed the selected satellite image on the basis of positioning data indicative of a position of said satellite when it remotely sensed the selected satellite image, and also on the basis of orbital data indicative of a corresponding space orbit of said satellite when it remotely sensed the selected satellite image;
   (iii) generating georeferencing data for the selected satellite image on the basis of the computed space location of the satellite and also on the basis of remote sensing data indicative of a field of view and a spatial resolution of a remote sensing device by means of which said satellite remotely sensed the selected satellite image, the georeferencing data being indicative of an area of the earth's surface shown in the selected satellite image;
   (iv) checking whether a given geographic area is represented, even if only partially, in the selected satellite image by comparing the generated georeferencing data of said selected satellite image with input data of the given geographic area; and
   (vi) retrieving the selected satellite image if the given geographic area is represented, even if only partially, in the selected satellite image.

14. Electronic retrieving means for a satellite image retrieving system, the electronic retrieving means comprising the non-transitory processor readable medium of claim 13 and electronic processing means for executing the processor executable instructions, said electronic retrieving means being adapted for coupling with:
   (i) electronic input means (21) configured to generate the input data of the given geographic area and to provide the electronic retrieving means (22) with said input data; and
   (ii) electronic storing means (23) configured to store:
      (i) satellite images each representing a corresponding area of the earth's surface, and
      (ii) for each stored satellite image, corresponding telemetry data generated and associated with the stored satellite image by a satellite that has remotely sensed the stored satellite image,
      said corresponding telemetry data including:
         (i) positioning data indicative of a position of said satellite when it has remotely sensed the stored satellite image, and
         (ii) remote sensing data indicative of a field of view and a spatial resolution of a remote sensing device by means of which said satellite has remotely sensed the stored satellite image.

15. A method for retrieving a satellite image, the method comprising:
   (i) selecting a satellite image;
   (ii) computing a space location of a satellite that has remotely sensed the selected satellite image on the basis of positioning data indicative of a position of said satellite when it remotely sensed the selected satellite image, and also on the basis of orbital data indicative of a corresponding space orbit of said satellite when it remotely sensed the selected satellite image;
   (iii) generating georeferencing data for the selected satellite image on the basis of the computed space location of the satellite and also on the basis of remote sensing data indicative of a field of view and a spatial resolution of a remote sensing device by means of which said satellite remotely sensed the selected satellite image, the georeferencing data being indicative of an area of the earth's surface shown in the selected satellite image;
   (iv) checking whether a given geographic area is represented, even if only partially, in the selected satellite image by comparing the generated georeferencing data of said selected satellite image with input data of the given geographic area; and
   (vi) retrieving the selected satellite image if the given geographic area is represented, even if only partially, in the selected satellite image.

* * * * *